(12) United States Patent
Flordelis et al.

(10) Patent No.: US 12,355,510 B2
(45) Date of Patent: Jul. 8, 2025

(54) PHASE SHIFTS FOR IMPROVING COMMUNICATION VIA COVERAGE ENHANCING DEVICES

(71) Applicant: Sony Group Corporation, Tokyo (JP)

(72) Inventors: Jose Flordelis, Lund (SE); Erik Bengtsson, Eslöv (SE); Fredrik Rusek, Eslöv (SE); Olof Zander, Södra Sandby (SE); Kun Zhao, Malmö (SE)

(73) Assignee: Sony Group Corporation, Tokyo (JP)

( * ) Notice: Subject to any disclaimer, the term of this patent is extended or adjusted under 35 U.S.C. 154(b) by 126 days.

(21) Appl. No.: 18/283,355

(22) PCT Filed: Mar. 29, 2022

(86) PCT No.: PCT/EP2022/058242
§ 371 (c)(1),
(2) Date: Sep. 21, 2023

(87) PCT Pub. No.: WO2022/207629
PCT Pub. Date: Oct. 6, 2022

(65) Prior Publication Data
US 2024/0056130 A1 Feb. 15, 2024

(30) Foreign Application Priority Data
Mar. 31, 2021 (SE) .................................. 2150404-8

(51) Int. Cl.
*H04B 7/04* (2017.01)
*H04B 7/06* (2006.01)
*H04B 7/155* (2006.01)

(52) U.S. Cl.
CPC ....... *H04B 7/04013* (2023.05); *H04B 7/0617* (2013.01); *H04B 7/15528* (2013.01)

(58) Field of Classification Search
CPC .............. H04B 7/04013; H04B 7/0617; H04B 7/15528; H04W 88/04
See application file for complete search history.

(56) References Cited

U.S. PATENT DOCUMENTS

| | | | |
|---|---|---|---|
| 2005/0014464 A1 | 1/2005 | Larsson | |
| 2021/0013619 A1* | 1/2021 | Alkhateeb | .......... H04B 7/04013 |
| 2024/0348323 A1* | 10/2024 | Zhao | .................. H04B 7/15528 |

FOREIGN PATENT DOCUMENTS

| | | |
|---|---|---|
| CN | 111983560 A | 11/2020 |
| WO | 2020254030 A1 | 12/2020 |
| WO | 2020254031 A1 | 12/2020 |

OTHER PUBLICATIONS

Office Action and Search Report from corresponding Swedish Application No. 2150404-8, mailed on Dec. 16, 2021, 10 pages.
(Continued)

*Primary Examiner* — Sung S Ahn
(74) *Attorney, Agent, or Firm* — Tucker Ellis LLP

(57) ABSTRACT

According to a first aspect, examples provide a method of operating a first communication node (CN), wherein the first CN is configured for controlling a first CED, wherein the first CED is reconfigurable to provide multiple spatial filterings, each one of the multiple spatial filtering being associated with a respective input spatial direction from which incident signals on a radio channel are accepted and with a respective output spatial direction into which the incident signals are transmitted by the first CED. The method comprises receiving, from a second CN on the radio channel, a first reference signal via a first propagation path and a second propagation path, wherein receiving the first reference signal via the first propagation path involves receiving a component of the reference signal via the first CED, measuring a first reception property of the first reference signal, and providing, to the first CED, a message for
(Continued)

configuring the first CED to induce a first phase shift in the first propagation path. Further examples provide a further method of operating a first CN methods of operating a CED as well as respective first CNs, second CNs and CEDs.

20 Claims, 6 Drawing Sheets

(56) References Cited

OTHER PUBLICATIONS

International Search Report and Written Opinion from corresponding International Application No. PCT/EP2022/058242, mailed on Jul. 18, 2022, 11 pages.
George C. Alexandropoulos et al., "Phase Configuration Learning in Wireless Networks with Multiple Reconfigurable Intelligent Surfaces," 2020 IEEE Globecom Workshops, dated 2020, 6 pages.
Ertugrul Basar et al., "Wireless Communications Through Reconfigurable Intelligent Surfaces," IEEE Access, vol. 7, Aug. 13, 2019, 21 pages.
Jinming Zhang et al., "Channel Estimation for Reconfigurable Intelligent Surface Aided Massive MIMO System," 2020 IEEE 21st International Workshop on Signal Processing Advances in Wireless Communications (SPAWC), dated 2020, 5 pages.

* cited by examiner

PHASE SHIFTS FOR IMPROVING COMMUNICATION VIA COVERAGE ENHANCING DEVICES

TECHNICAL FIELD

Various examples generally relate to communicating between nodes using coverage enhancing devices.

BACKGROUND

In order to increase a coverage area for wireless communication, it is envisioned to use coverage enhancing devices (CEDs), particularly re-configurable relaying devices (RRD), more particularly, re-configurable reflective devices. Re-configurable reflective devices are sometimes also referred to as reflecting large intelligent surface (LIS). See, e.g., Sha Hu, Fredrik Rusek, and Ove Edfors. "Beyond massive MIMO: The potential of data transmission with large intelligent surfaces." *IEEE Transactions on Signal Processing* 66.10 (2018): 2746-2758.

An RRD can be implemented by an array of antennas that can reflect incident electromagnetic waves/signals. The array of antennas can be semi-passive. Semi-passive can correspond to a scenario in which the antennas can impose a variable phase shift and typically provide no signal amplification. An input spatial direction from which incident signals on a radio channel are accepted and an output spatial direction into which the incident signals are reflected can be re-configured, by changing a phase relationship between the antennas. Radio channel may refer to a radio channel specified by the 3GPP standard. In particular, the radio channel may refer to a physical radio channel. The radio channel may offer several time/frequency-resources for communication between different communication nodes of a communication system.

An access node (AN) may transmit signals to a wireless communication device (UE) via a CED. The CED may receive the incident signals from an input spatial direction and emit the incident signals in an output spatial direction to the UE. The AN may transmit the signals using a beam directed to the CED. In some scenarios, several CEDs may be used in parallel to transmit the signals from the AN to the UE. For example, a signal may be transmitted from the AN to the UE via a first propagation path and a second propagation path, wherein the first propagation path involves a reception and transmission of the signal by a first CED, and wherein the second propagation path involves a reception and transmission of the signal by a second CED.

In case of different propagation path lengths of the first propagation path and the second propagation path, the signal portions propagating via the first propagation path and the second propagation path may not necessarily interfere constructively and the improved coverage associated with the combined surfaces of the first CED and the second CED may not be obtained to the full extent. In particular, there may be at least some phase incoherence between the respective signal portions.

SUMMARY

Accordingly, there may be a need for further improving communication between nodes using coverage enhancing devices (CEDs).

Said need is addressed with the subject matter of the independent claims. The dependent claims describe further advantageous examples.

According to a first aspect, examples provide a method of operating a first communication node (CN), wherein the first CN is configured for controlling a first CED, wherein the first CED is reconfigurable to provide multiple spatial filterings, each one of the multiple spatial filterings being associated with a respective input spatial direction from which incident signals on a radio channel are accepted and with a respective output spatial direction into which the incident signals are transmitted by the first CED. The method comprises receiving, from a second CN on the radio channel, a first reference signal via a first propagation path and a second propagation path, wherein receiving the first reference signal via the first propagation path involves receiving a component of the reference signal via the first CED, measuring a first reception property of the first reference signal, and providing, to the first CED, a message for configuring the first CED to induce a first phase shift in the first propagation path.

According to a second aspect, examples provide a method of operating a first CN, wherein the first CN is configured for controlling a first CED, the first CED being reconfigurable to provide multiple spatial filterings, each one of the multiple spatial filterings being associated with a respective input spatial direction from which incident signals on a radio channel are accepted and with a respective output spatial direction into which the incident signals are transmitted by the first CED. The method comprises transmitting, to a second CN on the radio channel, a first reference signal via a first propagation path and a second propagation path, wherein transmitting the first reference signal via the first propagation path involves transmitting a component of the reference signal via the first CED, obtaining, from the second CN, a message indicative of a first reception property of the first reference signal, and providing, to the first CED, a message for configuring the first CED to induce a first phase shift in the first propagation path.

According to a third aspect, examples provide a method of operating a first CED, the first CED being reconfigurable to provide multiple spatial filterings, each one of the multiple spatial filterings being associated with a respective input spatial direction from which incident signals on a radio channel are accepted and with a respective output spatial direction into which the incident signals are transmitted by the first CED. The method comprising obtaining, from a first communication node, CN, a message for configuring the first CED to induce a first phase shift in a first propagation path between the first CN and a second CN.

Further aspects provide examples of first CNs and first CEDs comprising control circuitry for performing respective methods.

DETAILED DESCRIPTION

Figure 1:
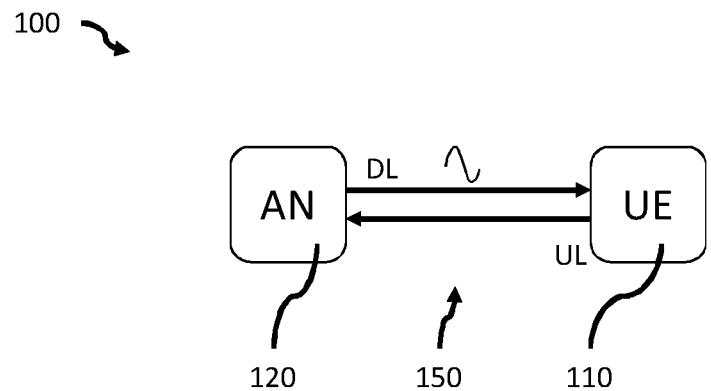
FIG. 1 schematically illustrates a communication system according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Techniques are described that facilitate wireless communication between nodes. A wireless communication system includes a transmitter node and one or more receiver nodes. In some examples, the wireless communication system can be implemented by a wireless communication network, e.g., a radio-access network (RAN) of a Third Generation Partnership Project (3GPP)-specified cellular network (NW). In such case, the transmitter node can be implemented by an access node (AN), in particular, a base station (BS), of the RAN, and the one or more receiver nodes can be implemented by terminals (also referred to as user equipment, UE). It would also be possible that the transmitter node is implemented by a UE and the one or more receiver nodes are implemented by an AN and/or further UEs. Hereinafter, for the sake of simplicity, various examples will be described with respect to an example implementation of the transmitter node by an AN and the one or more receiver node by UEs—i.e., to downlink (DL) communication; but the respective techniques can be applied to other scenarios, e.g., uplink (UL) communication and/or sidelink communication.

Communication Via CEDs

According to various examples, the transmitter node can communicate with at least one of the receiver nodes via one or more CEDs.

The CEDs may include an antenna array. The CEDs may include a meta-material surface. In examples, the CEDs may include a reflective antenna array (RAA).

There are many schools-of-thought for how CEDs should be integrated into 3GPP-standardized RANs.

In an exemplary case, the NW operator has deployed the CEDs and is, therefore, in full control of the CED operations. The UEs, on the other hand, may not be aware of the presence of any CED, at least initially, i.e., it is transparent to a UE whether it communicates directly with the AN or via the CEDs. The CEDs essentially function as a coverage-extender of the AN. The AN may have established control links with the CEDs.

According to another exemplary case, it might be a private user or some public entity that deploys the CEDs. Further, it may be that the UE, in this case, controls CED operations. The AN, on the other hand, may not be aware of the presence of any CED and, moreover, may not have control over it/them whatsoever. The UE may gain awareness of the presence of a CED by means of some short-range radio technology, such as Bluetooth, wherein Bluetooth may refer to a standard according to IEEE 802.15, or WiFi, wherein WiFi may refer to a standard according to IEEE 802.11, by virtue of which it may establish the control link with the CED. It is also possible that the UE gains awareness of the presence of a CED using UWD (Ultra wideband) communication. Using UWB may offer better time resolution due to the wider bandwidth compared to other radio technologies.

The two exemplary cases described above are summarized in TAB. 1 below.

TABLE 1

Scenarios for CED integration into cellular NW

| Scenario | Description | Explanation |
|---|---|---|
| A | AN-CED control link | AN controls the CED and/or can obtain information from the CED. A control link is established between the AN and the CED. |
| B | UE-CED control link | UE controls the CED and/or can obtain information from the CED. A control link is established between the UE and the CED. |

Hereinafter, techniques will be described which facilitate communication between a transmitter node—e.g., an AN—and one or more receiver nodes—e.g., one or more UEs—using a CED.

FIG. 1 schematically illustrates a communication system 100. The communication system 100 includes two nodes 110, 120 that are configured to communicate with each other via a radio channel 150. In the example of FIG. 1, the node 120 is implemented by an access node (AN) and the node 110 is implemented by a UE. The AN 120 can be part of a cellular NW (not shown in FIG. 1).

As a general rule, the techniques described herein could be used for various types of communication systems, e.g., also for peer-to-peer communication, etc. For the sake of simplicity, however, hereinafter, various techniques will be described in the context of a communication system that is implemented by an AN 120 of a cellular NW and a UE 110.

As illustrated in FIG. 1, there can be DL communication, as well as UL communication. Examples described herein particularly focus on the DL communication, but similar techniques may be applied to UL communication and/or sidelink communication. Input sweep and receive beam sweep may relate to DL communication and output sweep and transmit beam sweep may relate to UL communication.

Figure 2:
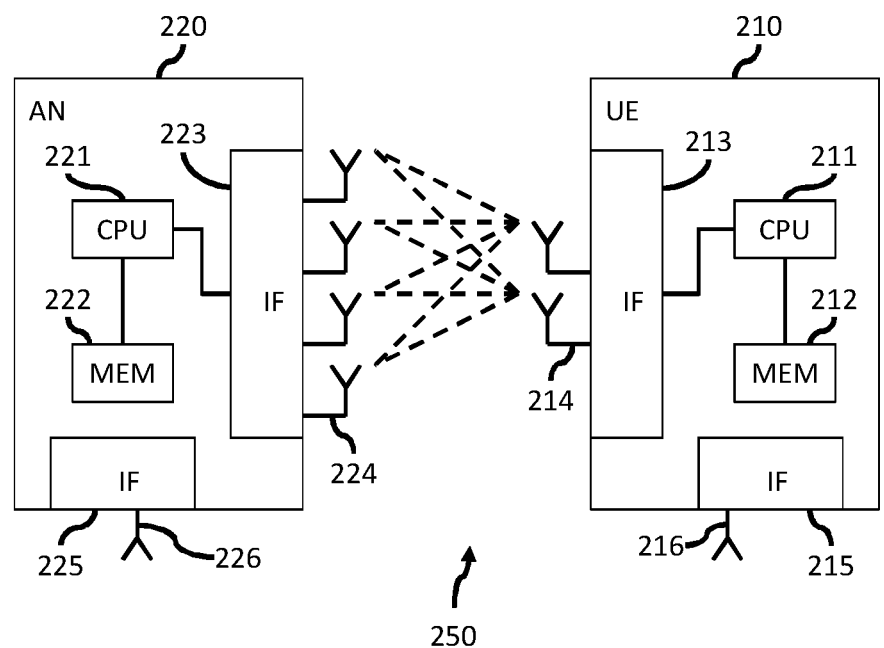
FIG. 2 schematically illustrates details of the communication system according to the example of FIG. 1.

FIG. 2 illustrates details with respect to the AN 220. The AN 220 includes control circuitry that is implemented by a processor 221 and a non-volatile memory 222. The processor 221 can load program code that is stored in the memory 222. The processor 221 can then execute the program code. Executing the program code causes the processor to perform techniques as described herein.

Moreover, FIG. 2 illustrates details with respect to the UE 210. The UE 210 includes control circuitry that is implemented by a processor 211 and a non-volatile memory 212. The processor 211 can load program code that is stored in the memory 212. The processor can execute the program code. Executing the program code causes the processor to perform techniques as described herein.

Further, FIG. 2 illustrates details with respect to communication between the AN 220 and the UE 210 on the radio channel 250. The AN 220 includes an interface 223 that can access and control multiple antennas 224. Likewise, the UE 210 includes an interface 213 that can access and control multiple antennas 214.

The UE 210 comprises a further interface 215 that can access and control at least one antenna 216 to transmit or receive a signal on an auxiliary radio channel different from the radio channel 250. Likewise, the AN 220 may comprise an additional interface 225 that can access and control at least one antenna 226 to transmit or receive a signal on the or a further auxiliary radio channel different from the radio channel. In general, the interface 225 may also be a wired interface. It may also be possible that the interface 225 is a wired or wireless optical interface. If wireless, the auxiliary radio channel may use in-band signaling or out-of-band signaling. The radio channel and the auxiliary radio channel may be offset in frequency. The auxiliary radio channel may be at least one of a Bluetooth radio channel, a WiFi channel, or an ultra-wideband radio channel. Methods for determining an angle of arrival may be provided by a communication protocol associated with the auxiliary radio channel. For example, methods for determining an angle of arrival may be provided by a Bluetooth radio channel.

While the scenario of FIG. 2 illustrates the antennas 224, 226 being coupled to the AN 220, as a general rule, it would be possible to employ transmit-receive points (TRPs) that are spaced apart from the AN 220.

The interfaces 213, 223 can each include one or more TX chains and one or more receiver chains. For instance, such RX chains can include low noise amplifiers, analogue to digital converters, mixers, etc. Analogue and/or digital beamforming would be possible.

Thereby, phase-coherent transmitting and/or receiving (communicating) can be implemented across the multiple antennas 214, 224. Thereby, the AN 220 and the UE 210 can selectively transmit on multiple TX beams (beamforming), to thereby direct energy into distinct spatial directions.

By using a TX beam, the direction of the wavefront of signals transmitted by a transmitter of the communication system is controlled. Energy is focused into a respective direction or even multiple directions, by phase-coherent superposition of the individual signals originating from each antenna 214, 224. Energy may also be focused to a specific point (or small sphere) at a specific direction and a specific distance of the transmitter. Thereby, a data stream may be directed in multiple spatial directions and/or to multiple specific points. The data streams transmitted on multiple beams can be independent, resulting in spatial multiplexing multi-antenna transmission; or dependent on each other, e.g., redundant, resulting in diversity multi-input multi-output (MIMO) transmission.

As a general rule, alternatively or additionally to such TX beams, it is possible to employ receive (RX) beams.

Figure 3:
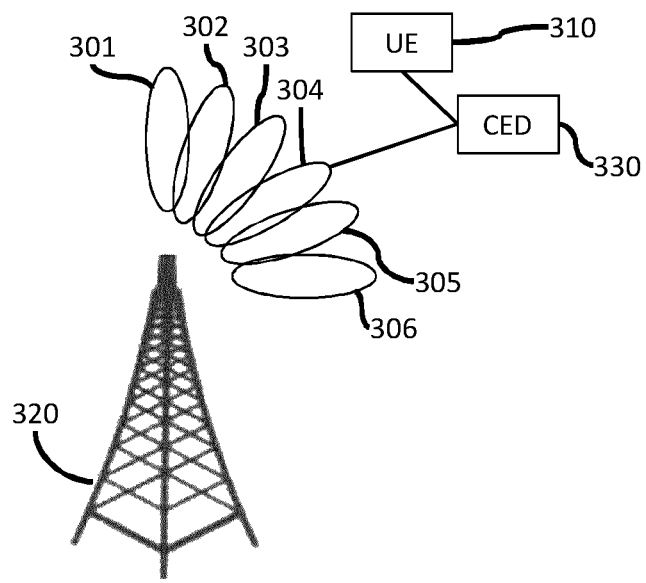
FIG. 3 schematically illustrates multiple downlink transmit beams used at a transmitter node of the communication system and further schematically illustrates a CED towards which one of the multiple transmit beams is directed according to various examples.

FIG. 3 illustrates DL TX beams 301-306 used by the AN 320. Here, the AN 320 activates the beams 301-306 on different resources (e.g., different time-frequency resources, and/or using orthogonal codes/precoding) such that the UE 310 can monitor for respective signals transmitted on the DL TX beams 301-306.

It is possible that the AN 320 transmits signals to the UE 310 via a CED 330. In the scenario of FIG. 3, the downlink transmit beam 304 is directed towards the CED 330. Thus, whenever the AN 320 transmits signals to the UE 310 using the downlink transmit beam 304—e.g., a respective block of a burst transmission—a spatial filter is provided by the CED 330. The spatial filter is associated with a respective spatial direction into which the incident signals are then selectively reflected by the CED 330. Details with respect to the CED 330 are illustrated in connection with FIG. 4.

Figure 4:
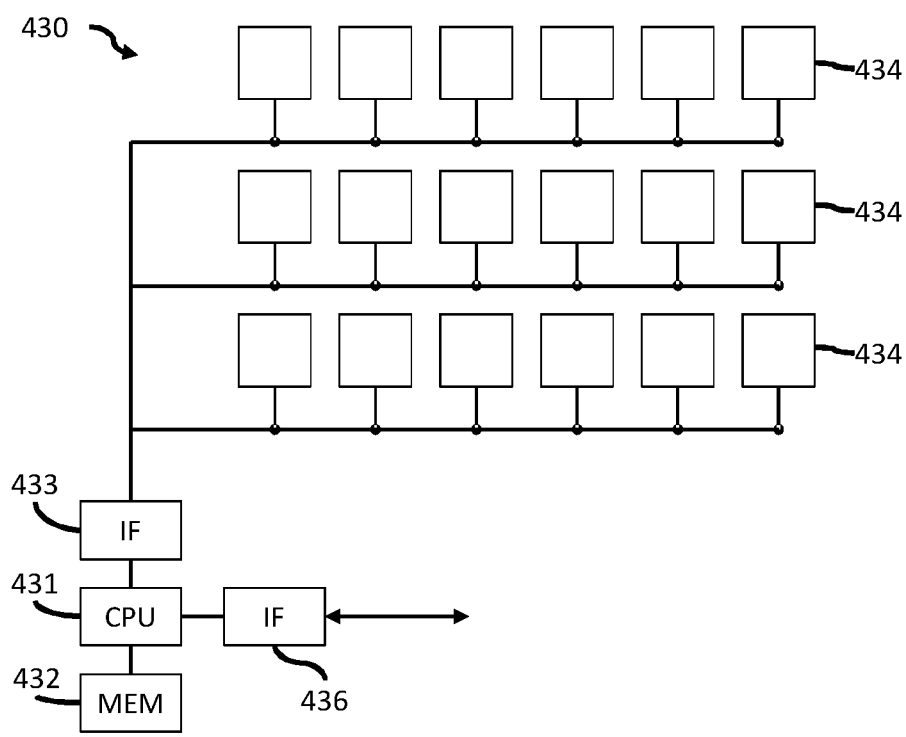
FIG. 4 schematically illustrates details with respect to a CED.

FIG. 4 illustrates aspects in connection with the CED 430. The CED 430 includes a phased array of antennas 434 that impose a configurable phase shift when reflecting incident signals. This defines respective spatial filters that may be associated with spatial directions into which the incident signals are reflected. The antennas 434 can be passive or semi-passive elements. The CED 430 thus provides coverage extension by reflection of radio-frequency (RF) signals. A translation to the baseband may not be required. This is different to, e.g., decode-and-forward repeater or regenerate functionality. The antennas 434 may induce an amplitude shift by attenuation. In some examples, the antennas 434 may provide forward amplification with or without translation of signals transmitted on the radio channel to the base band. In some examples, the CEDs may be configurable to shift power from one polarization to the orthogonal polarization. The antennas 434 may amplify and forward the signals.

The CED 430 includes an antenna interface 433, which controls an array of antennas 434; a processor 431 can activate respective spatial filters one after another. The CED 430 further includes an interface 436 for receiving and/or transmitting signals on an auxiliary radio channel 460. There is a memory 432 and the processor 431 can load program code from the non-volatile memory and execute the program code. Executing the program code causes the processor to perform techniques as described herein.

FIG. 4 is only one example implementation of a CED. Other implementations are conceivable. For example, a meta-material surface not including distinct antenna elements may be used. The meta-material can have a configurable refraction index. To provide a re-configurable refraction index, the meta-material may be made of repetitive tunable structures that have extensions smaller than the wavelength of the incident RF signals.

Transmitting Signals on a Radio Channel Via Two or More Coverage Enhancing Devices (CEDs)

Figure 5:
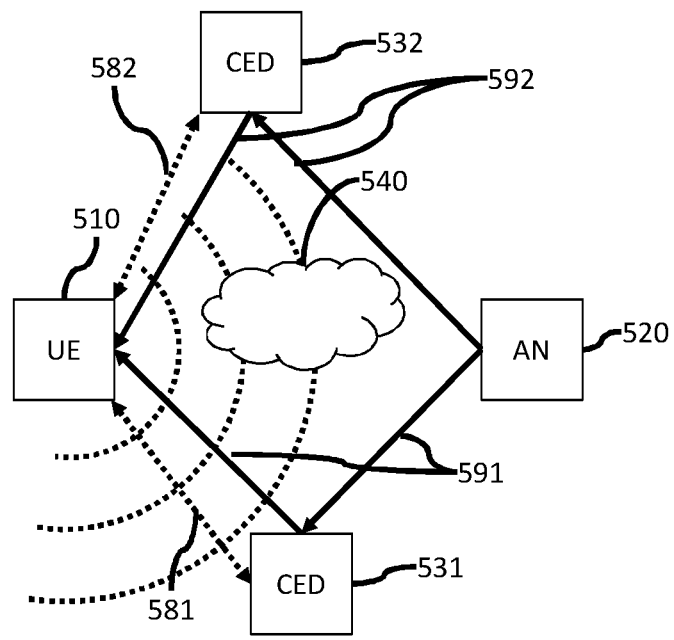
FIG. 5 schematically illustrates a scenario for using CEDs.

FIG. 5 illustrates an exemplary scenario B as described hereinbefore with reference to TAB. 1. A UE 510 is to communicate with an AN 520 over a radio channel via a first propagation path 591. The radio channel may be a 5G NR channel, in particular, a 5G NR channel in Frequency Range 2 or beyond. It is also conceivable that the radio channel is a 3GPP channel belonging to the frequency range from 7 to 24 GHz. An obstacle 540 between the UE 510 and the AN 520 may impede a direct line-of-sight communication between the UE 510 and the AN 520 on the radio channel.

A CED 531 may be employed to provide a physical propagation path 591 for the communication over the radio channel. In some examples, the position and orientation of the CED 531 with respect to the AN 520 may be fixed and known to the CED 531. As described hereinbefore, the CED 531 may be semi-passive and free of circuitry for encoding and decoding signals transmitted over the radio channel.

The CED 531 may provide multiple spatial filters, wherein each one of the multiple spatial filters is associated with a respective input spatial direction from which incident signals on a radio channel are accepted and with a respective output spatial direction into which the incident signals are reflected by the CED.

The CED 531 may perform an output sweep comprising changing the output spatial direction while using the given input spatial direction. In particular, the output sweep may be performed over signals transmitted by the AN 520. For example, the CED 531 can toggle through different output spatial directions by changing the phase relationships between the antenna elements.

The AN may send reference signals at certain times to the CED which emits the reference signals in different output spatial directions. During the beam sweep, the incident signals accepted by the CED are typically not emitted in an output spatial direction to the UE. In case the UE receives the reference signal, the reception properties determined by the UE may be used to re-configure the CED.

A further CED 532 may be employed to provide an additional (second) physical propagation path 592 for the communication over the radio channel. Both the first CED 531 and the second CED 532 may be controlled by the UE 510 via signaling 581 and 582, respectively.

In case of different propagation path lengths of the first propagation path and the second propagation path, the signal portions propagating via the first propagation path 591 and the second propagation path 592 may not necessarily interfere constructively and the improved coverage associated with the combined surfaces of the first CED 531 and the second CED 532 may not be obtained to the full extent. There may be at least some phase incoherence between the signal portions. FIG. 5 is an example of first communication node, CN, controlling the CEDs, wherein the first CN is receiving signals on the radio channel transmitted by a second communication node via the first propagation path and the second propagation path. In the example, the first CN is implemented by a UE and the second CN by an AN. However, it is also possible that the first CN is implemented by an AN and the second CN by a UE. In some scenarios, even both the first CN and the second CN may be implemented by UEs.

Figure 6:
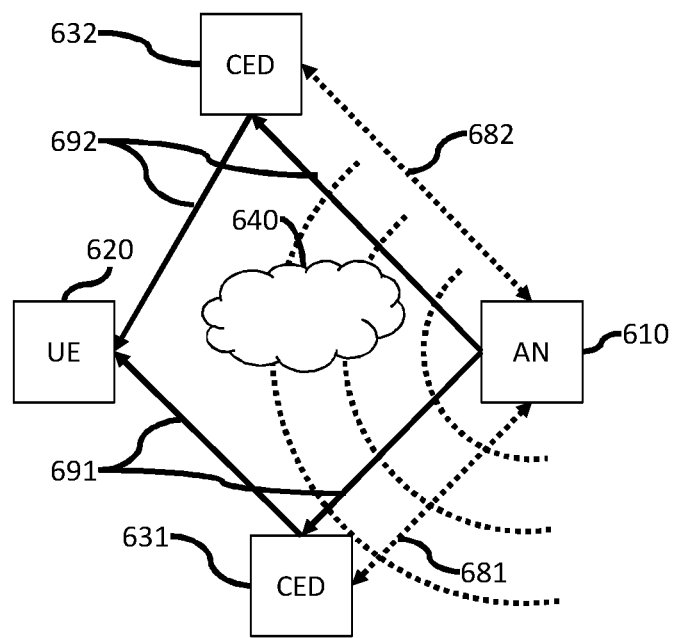
FIG. 6 schematically illustrates a scenario for using CEDs.

FIG. 6 illustrates an exemplary scenario A as described hereinbefore with reference to TAB. 1. An AN 610 is to communicate with a UE 620 over a radio channel via a first propagation path 691. The radio channel may be a 5G NR channel, in particular, a 5G NR channel in Frequency Range 2 or beyond. It is also conceivable that the radio channel is a 3GPP channel belonging to the frequency range from 7 to 24 GHz. An obstacle 640 between the UE 620 and the AN 610 may impede a direct line-of-sight communication between the UE 620 and the AN 610 over the radio channel.

A first CED 631 may be employed to provide a physical propagation path 691 for the communication over the radio channel. In some examples, the position and orientation of the first CED 631 with respect to the AN 610 may be fixed and known to the first CED 631. As described hereinbefore, the CED 631 may be semi-passive and free of circuitry for encoding and decoding signals transmitted over the radio channel.

The CED 631 may provide multiple spatial filters, wherein each one of the multiple spatial filters is associated with a respective input spatial direction from which incident signals on a radio channel are accepted and with a respective output spatial direction into which the incident signals are reflected by the first CED 631.

The CED 631 may perform an output sweep comprising changing the output spatial direction while using the given input spatial direction. In particular, the output sweep may be performed over signals transmitted by the AN 610. For example, the CED 631 can toggle through different output spatial directions by changing the phase relationships between the antenna elements.

The AN may send reference signals at certain times to the CED which emits the reference signals in different output spatial directions. During the beam sweep, the incident signals accepted by the CED are typically not emitted in an output spatial direction toward the UE. In case the UE receives the reference signal, the reception properties determined by the UE may be fed back to the AN and used to re-configure the CED.

A further CED 632 may be employed to provide an additional (second) physical propagation path 692 for the communication over the radio channel. Both the first CED 631 and the second CED 632 may be controlled by the AN 610 via signaling 681 and 682, respectively.

In case of different propagation path lengths of the first propagation path and the second propagation path, the signal portions propagating via the first propagation path 691 and the second propagation path 692 may not necessarily interfere constructively and the improved coverage associated with the combined surfaces of the first CED 631 and the second CED 632 may not be obtained to the full extent. There may be at least some phase incoherence between the signal portions. FIG. 6 is an example of first communication node, CN, controlling the CEDs, wherein the first CN is transmitting signals on the radio channel transmitted by a second communication node via the first propagation path and the second propagation path. In the example, the first CN is implemented by an AN and the second CN by a UE. However, it is also possible that the first CN is implemented by a UE and the second CN by an AN. In some scenarios, even both the first CN and the second CN may be implemented by UEs.

Applying Phase Shifts to Improve Communication Using at Least One CED

In an exemplary scenario, without loss of generality, a single UE with a single antenna port is to receive a signal from an AN over a radio channel via CEDs.

In a given resource element (RE) of the radio channel, the data value x is to be communicated by the AN. The AN uses beamforming across its antennas and transmits the vector cx; the dimension of said vector equals the number of antennas at the AN. The radio channel between the AN and the n-th CED can be represented with the matrix $G_n$, which has dimensions that reflect the number of antennas at the AN (number of columns) and the CED (number of rows). Accordingly, the received signal at the n-th CED may be described by $$u_n = G_n c x.$$

The n-th CED may apply spatial filtering, wherein each spatial filtering is associated with a respective input spatial direction from which incident signals on a radio channel are accepted (i.e., receive-beamforming) and with a respective output spatial direction into which the incident signals are transmitted by the CED (i.e., transmit-beamforming).

The spatial filterings may be represented as diagonal matrices, whose dimensions are commensurate with the number of antennas at the CEDs. Thus, the transmitted signal from the n-th CED may read $$v_n = \text{diag}(p_{tx,n}) \text{diag}(p_{rx,n}) G_n c x,$$

where diag(·) puts its argument along the main diagonal of an all-zero square matrix, and the p variables are row-vectors.

Assuming that the channel between the n-th CED to the UE's antenna port (i.e., including the UE's beamforming) as a row vector $h_n$, y at the UE becomes $$y = h_n v_n = h_n \text{diag}(p_{tx,n}) \text{diag}(p_{rx,n}) G_n c x.$$

Under ideal circumstances (line-of-sight (LOS) between the AN and the CEDs, no multipath reflections, and ideal beamforming at both AN and CEDs) the beamforming at the AN together with the receive-beamforming $\text{diag}(p_{rx,n}) G_n c$ may be represented by $$\text{diag}(p_{rx,n}) G_n c = \beta 1 = \beta [1 \; 1 \; \ldots \; 1]^T,$$

where β represents the overall path loss. Thus, y becomes $$y = h_n \text{diag}(p_{tx,n}) \text{diag}(p_{rx,n}) G_n c x = h_n \text{diag}(p_{tx,n}) \beta 1 x = h_n p^T_{tx,n} \beta x$$

Now, absorbing β into, e.g., $h_n$, removing the subscript "tx" from the transmit-beamforming, re-defining p as its complex conjugate, and taking a sum across all CEDs, leads to $$y = \sum_{n=1}^{N} x h_n p_n^H + w.$$

In non-ideal circumstances, i.e., non-ideal beamforming at the AN and non-ideal receive-beamforming at the CED, $\text{diag}(p_{rx,n}) G_n c$ may be represented by $$\text{diag}(p_{rx,n}) G_n c = e$$

with some arbitrary vector e. Then, y becomes $$y = h_n \text{diag}(p_{tx,n}) \text{diag}(p_{rx,n}) G_n c x = h_n \text{diag}(p_{tx,n}) e x = h_n \text{diag}(e^T) p^T_{tx,n} x.$$

Absorbing $\text{diag}(e^T)$ into $h_n$, i.e., re-defining $h_n$ as $h_n := h_n \text{diag}(e^T)$, removing the subscript "tx" from the transmit-beamforming, re-defining p as its complex conjugate, and take a sum across all CEDs, y may still be represented as $$y = \sum_{n=1}^{N} x h_n p_n^H + w.$$

Thus, $h_n$ may not strictly represent the channel between the UE and the CEDs, but rather an equivalent channel between the UE and the CEDs, in the sense that with such interpretation, the AN can be omitted from the mathematical exposition.

Thus, without loss of generality, in the exemplary scenario, in which a single UE with a single antenna port is to receive a signal from an AN over a radio channel via N CEDs, in a given resource element (RE) of the radio channel, the value x may be received by the n-th CED from the AN and may be forwarded by the n-th CED to the UE.

The UE may then receive the following value y in the respective RE:

$$y = \sum_{n=1}^{N} x h_n p_n^H + w$$

In the formula $h_n$ is the (equivalent) channel vector between the n-th CED and the UE, $p_n$ is a beamforming vector at the n-th CED, H means Hermitian transposition (conjugation and transposition), and w is a term relating to noise. The beamforming vector $p_n$ describes the spatial filtering performed by the respective CED.

Coherent CED transmission may refer to a scenario with vectors $p_n$ selected in such a way that the signal portions transmitted via the n CEDs interfere constructively at the UE. Using the expression $$h_n p_n^H = g_n \exp(i\varphi_n),$$

the requirement of constructive interference implies that all n CEDs should be configured to obtain $\varphi = \varphi_n$ such that y becomes $$y = x \exp(i\varphi) \sum_{n=1}^{N} g_n + w.$$

The ensuing signal-to-noise ratio (SNR) then becomes proportional to $(\Sigma_{n=1}^{N} g_n)^2$.

For a non-coherent CED transmission, on the other hand, y remains $$y = x \sum_{n=1}^{N} g_n \exp(i\varphi_n) + w$$

with an SNR proportional to $(\Sigma_{n=1}^{N} g_n \exp(i\varphi_n))^2$.

This SNR may be several orders of magnitude smaller than the SNR for coherent transmission.

Accordingly, there may be a need for improving transmission performance in networks using several CEDs.

Figure 7:
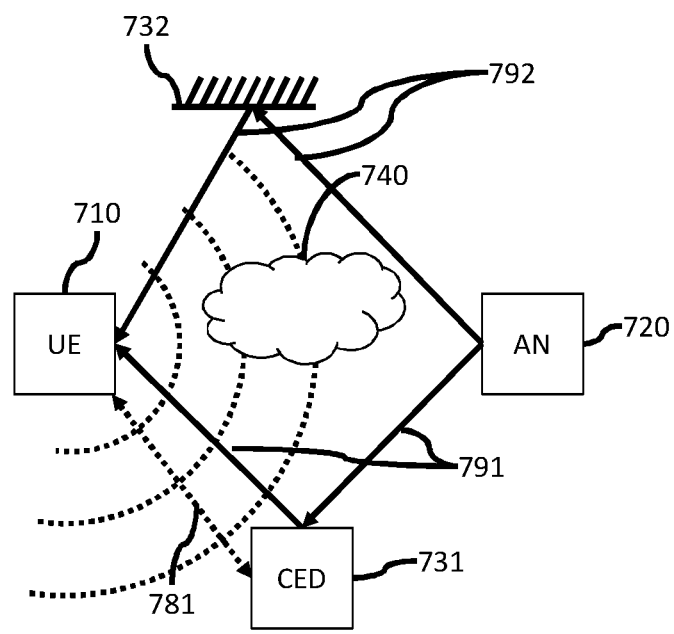
FIG. 7 schematically illustrates a scenario for using CEDS.

FIG. 7 shows a scenario with a UE 710, an AN 720 and a CED 731. The AN 720 may transmit signals on a radio channel to the UE 710 using a first propagation path 791 via the CED 731. In addition, there may exist a second propagation path 792 from the access node 720 to the UE 710 via an unintended reflection of the signal at a wall 732. The propagation path length for the two propagation paths 791 and 792 may be different. As a result, the two signal portions may not interfere completely constructively. In addition, the received signal strength at the UE 710 may vary as the UE 710 moves and the propagation path length difference changes accordingly (i.e. small-scale signal fading). If the signal strength from the two signal portions is the same, then the signal at the UE 710 may even cancel totally, which will result in outage.

The CED 731 may induce an additional phase shift to mitigate the small-scale signal fading introduced by the multiple propagation paths 791, 792. Ideally a time delay may be induced corresponding to a phase shift that is optimal for each frequency carrier. Typically, it is less complex to induce a phase shift by altering a capacitance setting leading to a frequency dependency of the mitigation. However, the relative bandwidth of the signal on the radio channel to be considered is comparably small. Hence, frequency dependency of the mitigation will not be particularly considered within the disclosure.

For each position of the UE 710, the induced phase shift may have to be adapted. Thus, there may be a need for methods allowing for a dynamic adaptation of the induced phase shift.

If the UE 710 controls the CED 731, the UE 710 may, based on a received signal strength, configure the CED 731 with different phase shifts or time delays (e.g., based on DL reference signals, such as, SSB or CSI-RS and detected variations of the receive signal strength spatially or across the operational bandwidth).

If the CED is controlled by an AN, the method may be based on signaling from the UE to the AN to trigger a shift, or the AN may, without indication from the UE, detect degradation of the signal quality and re-configure the CED.

For a CED comprising a reflecting antenna array, inducing a phase shift may comprise adding the same phase shift to all unit elements of the reflecting antenna array. In its simplest form, phase shifts may be quantized to only two states, such as 0 and 180 degrees (i.e., 0 and $\pi$). This simple scheme may be sufficient to avoid cancelation and may lead to a received signal being at least as strong as the reflected signal portion transmitted/received via the CED.

If a higher granularity of the induced phase shifts is possible, coherent addition of the signal portions transmitted via the different propagation paths may be obtained and, assuming two propagation paths, the received signal strength may be enhanced with up to a factor of two (i.e., the received signal power may be increased by a factor of four) in comparison to a transmission/reception only via the stronger propagation path. A higher granularity may require a more advanced optimization and associated signaling.

The CEDs may be configurable to apply a phase shift individually for two orthogonal polarizations. In some examples, the CEDs may be configurable to shift power from one polarization to the orthogonal polarization.

Applying Phase Shifts to Improve Communication Using Two or More CEDs

Generally, two or more CEDs may be involved in communication between a first CN and a second CN on a radio channel.

In the following scenario, a UE with M antenna ports may receive a signal y on a radio channel transmitted as signal x by AN with N antenna ports.

In the absence of noise, the input-output relation between the UE and the AN becomes $y=Ex$, wherein E is an M×N matrix. There is one instance of the above equation per subcarrier, but without loss of generality sub-indexing on subcarriers may be suppressed and an arbitrary carrier may be considered. It may be an object of the present disclosure to improve E to improve communication between the UE and AN.

In examples, K CEDs may be used for providing propagation paths from the AN to the UE. Each CED contributes to E via an M×N matrix $E_k$. In addition, there may exist a propagation path from the AN to the UE that does not go through any CED. Said propagation path may be a line-of-sight propagation path or a propagation path involving a natural reflection and may be denoted with $E_0$. Thus, E may be written as $$E = E_0 + E_1 + \cdots + E_K = \sum_{k=0}^{K} E_k.$$

After the spatial filterings of the CEDs have been configured with respect to the input/output spatial directions to/from the UE/AN (i.e., after beamforming), each CED may, for achieving a more coherent CED transmission, be configurable to linearly modify the channels $E_k$ via P control variables. Hence, $E_k$ may be decomposed as $$E_k = \Sigma_{p=1}^{P} E_{k,p} a_{k,p}, \quad (1)$$

where $a_{k,p}$ represent the P control variables at the k-th CED.

If $u_{k,q}$ denotes the input at antenna q of CED k, the output signal $v_{k,q}$ at said antenna will become $$v_{k,q} = u_{k,q}(B_{k,q,1} a_{k,1} + \ldots + B_{k,q,P} a_{k,P}),$$

wherein $B_{k,q,p}$ is representing the pth-beamforming pattern (spatial filtering) at CED k. These beamforming patterns are designed such that all antennas of CED k act coherently. Note that the control variables a are common for all antennas of CED k.

Thus, $E_k$ may be assumed to depend on: 1) the channel between the AN and the antennas of CED k, 2) the channel between the antennas of CED k and the UE, and 3) the beamforming patterns $B_{k,q,p}$.

According to an example, each CED may comprise M antennas, half of which are horizontally polarized and the others are vertically polarized. In case P=2 control variables are available and the beamforming pattern may be considered to be independent for the two polarizations, i.e., $B_{k,q,1}=0$ for q>M/2, and $B_{k,q,2}=0$ for q<M/2+1, all horizontally polarized antennas may have a jointly designed beamforming pattern and may be modified via $a_1$, and all vertically polarized antennas may have a jointly designed beamforming pattern and may be modified via $a_2$. The control variable $a_1$ does not impact any of the vertically polarized antennas, and vice versa.

According to a further example not considering polarization, each CED may group its antennas into three (3) disjoint sets. In each set p, the antennas multiply their incoming signal with a single beamforming dependent term $B_{k,q,p}$ resulting in $$B_{k,q,1} = 0, \quad q > \frac{M}{3}$$

$$B_{k,q,2} = 0, \quad q > \frac{M}{3} + 1 \text{ or } q > 2M/3$$

$$B_{k,q,3} = 0, \quad q > \frac{2M}{3} + 1.$$

In examples of hybrid beamforming, there may be at least 2 non-zero values of $B_{k,q,p}$ for the same value of q and k, but for different p.

In the case of passive CEDs, i.e. CEDs not performing any forward amplification, the values of $B_{k,q,p}$ and $a_{k,p}$ may be complex exponentials having unit magnitude.

As explained hereinbefore, the overall channel matrix $E=\Sigma_{k=0}^{K} E_k$ may be considered to depend on K·P values $a_{k,p}$. Improving the transmission of signals on the radio channel from the AN to the UE via the CEDs may be achieved by maximizing a cost function related to E. What this cost function is depends from case to case. Three examples are provided below, but others could also be provided.

In some examples, the cost function $$f(\{a_{k,p}\}) = \det[I + SNR EE^H] =$$

$$\det\left[I + SNR\left[E_0 + \sum_{k=1}^{K}\sum_{p=1}^{P} E_{k,p} a_{k,p}\right]\left[E_0 + \sum_{k=1}^{K}\sum_{p=1}^{P} E_{k,p} a_{k,p}\right]^H\right]$$

may be maximized over $a_{k,p}$ to improve the capacity of the channel between the AN and the UE.

In other examples, the cost function $$f(\{a_{k,p}\}) =$$

$$\lambda_{max}(EE^H) = \lambda_{max}\left(\left[E_0 + \sum_{k=1}^{K}\sum_{p=1}^{P} E_{k,p} a_{k,p}\right]\left[E_0 + \sum_{k=1}^{K}\sum_{p=1}^{P} E_{k,p} a_{k,p}\right]^H\right),$$

where $\lambda_{max}(\cdot)$ is the largest eigenvalue of its argument, may be maximized over $a_{k,p}$ to optimize the SNR for rank-1 transmissions.

Further examples may prescribe maximizing, over $a_{k,p}$, the cost function $$f(\{a_{k,p}\}) = Tr(EE^H) = Tr([E_0 + \Sigma_{k=1}^{K}\Sigma_{p=1}^{P} E_{k,p} a_{k,p}][E_0 + \Sigma_{k=1}^{K}\Sigma_{p=1}^{P} E_{k,p} a_{k,p}]^H),$$

where $Tr(\cdot)$ is the trace operator (sum of diagonal elements), maximize the transmitted energy for space-time-block-codes (e.g., Alamouti codes).

To maximize all above cost functions, estimates of $E_0$ and $\{E_{k,p}\}$ are required. Once estimates of $E_0$ and $\{E_{k,p}\}$ are available, the above-cited optimization problems may be solved using procedures known in the art.

The number of complex valued scalar variables to be estimated is N M (1+KP), since there are KP matrices $E_{k,p}$ and the single matrix $E_0$ to be considered and all said matrices have the size M×N.

For every reference signal sent from the AN, the UE may observe M values due to its M antenna ports. Therefore, at least T=N(1+KP) reference signal transmissions must take place.

In the following, passive CEDs may be assumed with $a_{k,p} = \exp(i\alpha_{k,p})$. The t-th reference signal may be described with reference vector $r_t$, and the phase values $\alpha_{k,p}$ applied at the CEDs during transmission of the respective reference signal $r_t$ may be denoted by $\alpha_t = [\alpha_{1,1,t}\ \alpha_{1,2,t}\ \ldots\ \alpha_{1,P,t}\ \alpha_{2,1,t}\ \ldots\ \alpha_{2,P,t}\ \ldots\ \alpha_{K,1,t}\ \ldots\ \alpha_{K,P,t}]$ where $\alpha_{k,p,t}$ is the value used at CED k for control variable p at time t. Simply put, $\alpha_t$ may be considered as collecting all control values used by the CEDs during transmission of the reference signal $r_t$. The unknowns may be estimable from the observations of the T reference signals $r_t$, if the following matrix R is invertible:

$$R = [[1 e^{i\alpha_1}]^T \otimes r_2 \ldots [1 e^{i\alpha_T}]^T \otimes r_T],$$

where $\otimes$ is the Kronecker product and $\exp(\cdot)$ of a vector valued argument should be understood as elementwise exponentiation.

Typically, randomly selecting $\{\alpha_t\}$ and $\{r_t\}$ may already render the matrix R invertible.

In examples, $\{r_t\}$ may be selected as $$r_t = I_{[t/N]},\ I_q = \begin{bmatrix} \underbrace{0\ \ldots\ 0}_{q-1} & 1 & \underbrace{0\ \ldots\ 0}_{N-q} \end{bmatrix}^T.$$

In words, this selection means that the T reference slots are divided into N equal segments, and in each segment a single AN antenna port is sounded.

For said selection of reference signals $\{r_t\}$, the values for $\{\alpha_t\}$ have to be selected.

Selecting each entry of all vectors $\alpha_t$ randomly from the set $\{0,\pi\}$ makes R invertible with very high probability. So, a simple way is to generate random vectors $\{\alpha_t\}$ until R is invertible.

In examples, two other choices may be advantageous. Both choices make use of repeated vectors $\{\alpha_t\}$ according to $$\alpha_{t+q(1+KP)} = \alpha_t, t=1\ldots(1+KP), q=2\ldots N.$$

In words, this means that for each sounded AN antenna port, the phase values at the CEDs are traversing the same sequence.

The first advantageous choice is to select the matrix $$[[1 e^{i\alpha_1}]^T [1 e^{i\alpha_2}]^T \ldots [1 e^{i\alpha_{1+KP}}]^T]$$

as a DFT matrix of size (1+KP). Said matrix may have the advantage of requiring less memory space compared to a matrix comprising a lot of random numbers.

A second advantageous choice is to select the matrix $$[[1 e^{i\alpha_1}]^T [1 e^{i\alpha_2}]^T \ldots [1 e^{i\alpha_{1+KP}}]^T]$$

as a Hadamard matrix of size (1+KP), wherein (1+KP) is 1, 2 or a multiple of 4.

Hereinbefore, transmission via an arbitrary carrier has been assumed and that the CEDs applies the control variables wideband, i.e., the control variables are the same across the entire bandwidth.

In examples, the channels $E_{k,p}$ may be frequency dependent. In such a case, the transmission and observation of reference signals should be performed per coherence bandwidth, wherein the coherence bandwidth relates to a bandwidth portion in which frequency dependency may be considered to be negligible. The cost function to be optimized needs to take the frequency dependency into account. For example, the cost function for optimizing the capacity of the channel between the AN and the UE may be modified to be a sum of cost functions across several coherence bandwidths $$f(\{x_{k,p}\}) = \sum_{d=1}^{D} \log \det[I + SNR_d E_d E_d^H] =$$

$$\sum_{d=1}^{D} \log \det\left[I + SNR\left[E_{d,0} + \sum_{k=1}^{K}\sum_{p=1}^{P} E_{d,k,p} a_{k,p}\right]\left[E_{d,0} + \sum_{k=1}^{K}\sum_{p=1}^{P} E_{d,k,p} a_{k,p}\right]^H\right]$$

where the index d indicates the respective coherence bandwidths. In examples, each coherence bandwidth may comprise one or more subcarriers of the radio channel.

In examples, the channel $E=\Sigma_{k=0}^{K}E_k$ may be considered essentially constant across several subcarriers, for example N subcarriers. Then, the N(1+KP) may be sent in (1+KP) OFDM symbols. In each OFDM symbol, the N different reference signals $I_1, \ldots, I_N$ can be sent in different (adjacent) subcarriers. Then, the CEDs may apply $\alpha_t$, t=1 . . . (1+KP) during (1+KP) OFDM symbols.

Summarizing, the following steps may be performed to improve communication between a first CN and a second CN via a plurality of CEDs, wherein the first CN is configured for controlling the CEDs. The first CN may obtain, from each CED, information on the number P of control variables. The first CN may determine the number K of CEDs participating in the communication between the first CN and the second CN on the radio channel, i.e. the number of CEDs providing separate propagation paths between the first CN and the second CN.

The first CN may provide, to each of the K CEDs, a message indicative of values of the one or more respective control variables $\{\alpha_{k,p,t}\}$ to be applied during transmission of the reference signals. Said message may directly indicate the values of the control variables. Alternatively, at least one CED may comprise a codebook of possible values for its control variables $\{\alpha_{k,p,t}\}$ and the message is indicative of the entry in the codebook to select.

The first CN may provide, to the CEDs, a message indicative of the T time slots used for transmitting the reference signals in which the CEDs are to apply the respective values of its control variables $\{\alpha_{k,p,t}\}$.

In the time slots, the reference signals $r_t$ are transmitted via the different propagation paths, wherein the different propagation paths are associated with the different CEDs and the CEDs apply the corresponding values for its control variables $\{\alpha_{k,p,t}\}$. The transmitted reference signals $r_t$ are received as observed signals $s_t$. Based on the reference signals $r_t$, the control variables $\{\alpha_{k,p,t}\}$ and the observed signals $s_t$, the propagation matrices $E_0$ and $\{E_{k,p}\}$ may be estimated and, based on a cost function, e.g., one of the cost functions explained, improved values for the control variables $\{\alpha_{k,p,t}\}$ to improve communication between the first CN and the second CN may be determined as explained above.

The first CN may provide, to the CEDs, a message configuring the CEDs to apply said improved values for the control variables $\{\alpha_{k,p,t}\}$ and the first CN may transmit and/or receive to and/or from the second CN payload data.

In examples, the reference signals $r_t$ may be transmitted by the first CN to the second CN and the second CN provides information on the observed signals $s_t$ to the first CN. In other examples, the reference signals $r_t$ may be transmitted by the second CN to the first CN which may directly observe the signals $s_t$ for estimating the observation matrices.

Figure 8:
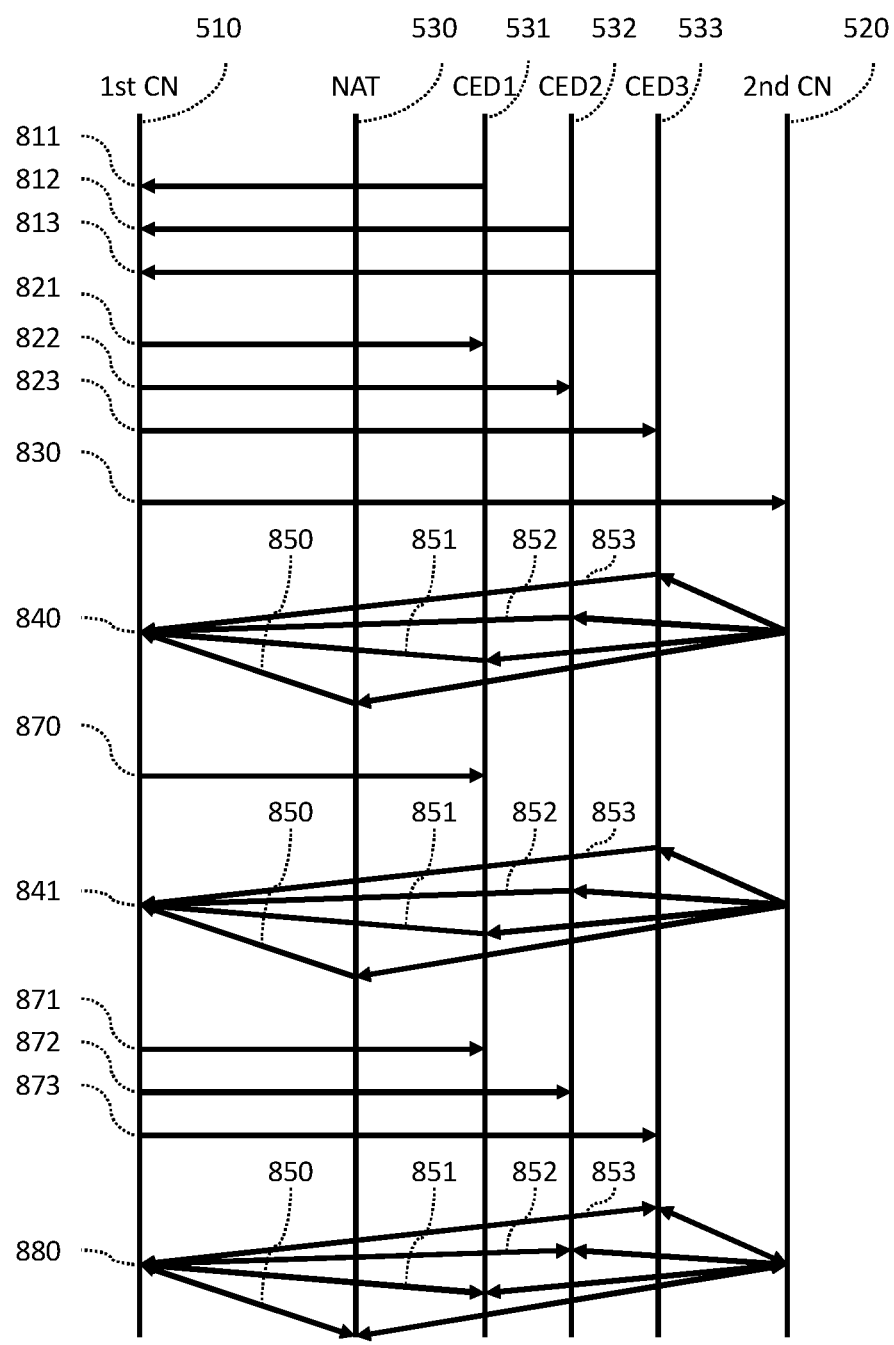
FIG. 8 is a signaling diagram illustrating communication in a network using CED.

FIG. 8 is a signaling diagram illustrating signaling for improving communication between a first CN 510 and a second CN 520 via propagation paths involving a transmission via one or more CEDs 531, . . . , 533 and optionally via a natural propagation path, wherein said natural propagation path may involve a reflection at a wall 530, for example.

The first CN is configured for controlling the first CED 531, wherein the first CED 531 is reconfigurable to provide multiple spatial filterings, each one of the multiple spatial filterings being associated with a respective input spatial direction from which incident signals on radio channel are accepted and with a respective output spatial direction into which the incident signals are transmitted by the first CED.

Optionally, the first CN 510 may obtain, from the first CED 531, a message 811 indicative of a capability of the first CED 531 to induce a phase shift before transmitting an incident signal into the output spatial direction. Corresponding messages 812, 813 may be provided by the second and third CEDs 532, 533 to the first CN 510.

The first CN receives, from the second CN on the radio channel, a first reference signal 840 via a first propagation path 851 and a second propagation path. Receiving the first reference signal 840 via the first propagation path 851 involves a reception of a component of the reference signal 840 via the first CED 531. The second propagation path may be a natural propagation path, i.e., a propagation path free of a reception/transmission by a CED, e.g. the propagation path 850. However, the second propagation path may also be a propagation path 852 involving a reception of a component of the reference signal 840 via the second CED 532.

The first CN 510 measures a first reception property of the first reference signal 840 and provides, to the first CED 531, a message 870 for configuring the first CED 531 to induce a first phase shift in the first propagation path. The signaling after message 870 is optional.

Afterwards, the first CN 510 may receive, from the second CN on the radio channel, a second reference signal 841 via the first propagation path 851 and the second propagation path 850, 852 and may measure a second reception property of the second reference signal 841. Based on a comparison of the first reception property and the second reception property, the first CN 510 may provide, to the first CED 531, a message 871 for configuring the first CED 531 to induce a second phase shift in the first propagation path or start receiving and/or transmitting payload data from and/or to the second CN 520 on the radio channel. In other words, the second reference signal 841 may be used to determine whether the first phase shift has already (sufficiently) improved the channel between the first CN 510 and the second CN 520 or whether a different, second phase shift should be induced by the first CED 531. Inducing a second phase shift may include not applying a phase shift at all.

Simply determining the reception property after changing phase shifts induced by CEDs and selecting the optimal phase shift from the applied phase shifts based on the reception properties may be particularly easy to implement.

The receiving of the first reference signal 840, measuring the first reception property and providing of the message 870 for configuring the first CED to induce a first phase shift in the first propagation path 851 may be triggered by a detection that a received relative signal power during an established communication between the first CN 510 and second 520 falls below a predefined threshold. This may also be referred to as detecting a fading signal power. The signal power may be determined during the exchange of payload data, for example during the exchange of payload data 880 as explained below.

Instead of simply testing different phase shifts, determining an appropriate phase shift may involve estimating the channel between the first CN 510 and the second CN 520 as well as optimizing control variables for the CEDs participating in the transmission of signals between the first CN 510 and the second CN 520 on the radio channel.

The first CN 510 may provide messages 821, 822, 823 to the CEDs 531, 532, 533 indicative of one or more values of respective control variables to be applied during transmission of reference signals. In the following, it may be assumed that the control variables correspond to phase shifts. The messages 821, 822, 823 may also be indicative of time slots for applying the phase shifts.

The second CN 520 may obtain, from the first CN 510, a message 830 triggering the second CN 520 to transmit reference signals 840, 841 to the first CN 510. In examples, the message 830 may be indicative of the reference signals to be transmitted. In other examples, the reference signals 840, 841 may be pre-configured by the network.

As explained above, the first CN 510 may measure reception properties of the reference signals 840, 841 and may determine optimized phase shifts. Some general examples for determining optimized values for control variables have been presented above. In examples, it may also be possible that the first CN 510 provides, to the second CN 520, a message indicative of the reception properties of the reference signals and obtains, from the second CN 520, a message indicative of the optimized phase shifts. The first alternative may require less signaling between the first CN 510 and the second 520, the second alternative may require less computational effort on behalf of the first CN 510.

The CEDs 531, 532, 533 may obtain, from the first CN 510, messages 871, 872, 873 indicative of the optimized phase shifts. Thereafter, the first CN 510 may start receiving and/or transmitting payload data 880 from and/or to the second CN 520 with the optimized phase shifts.

Figure 9:
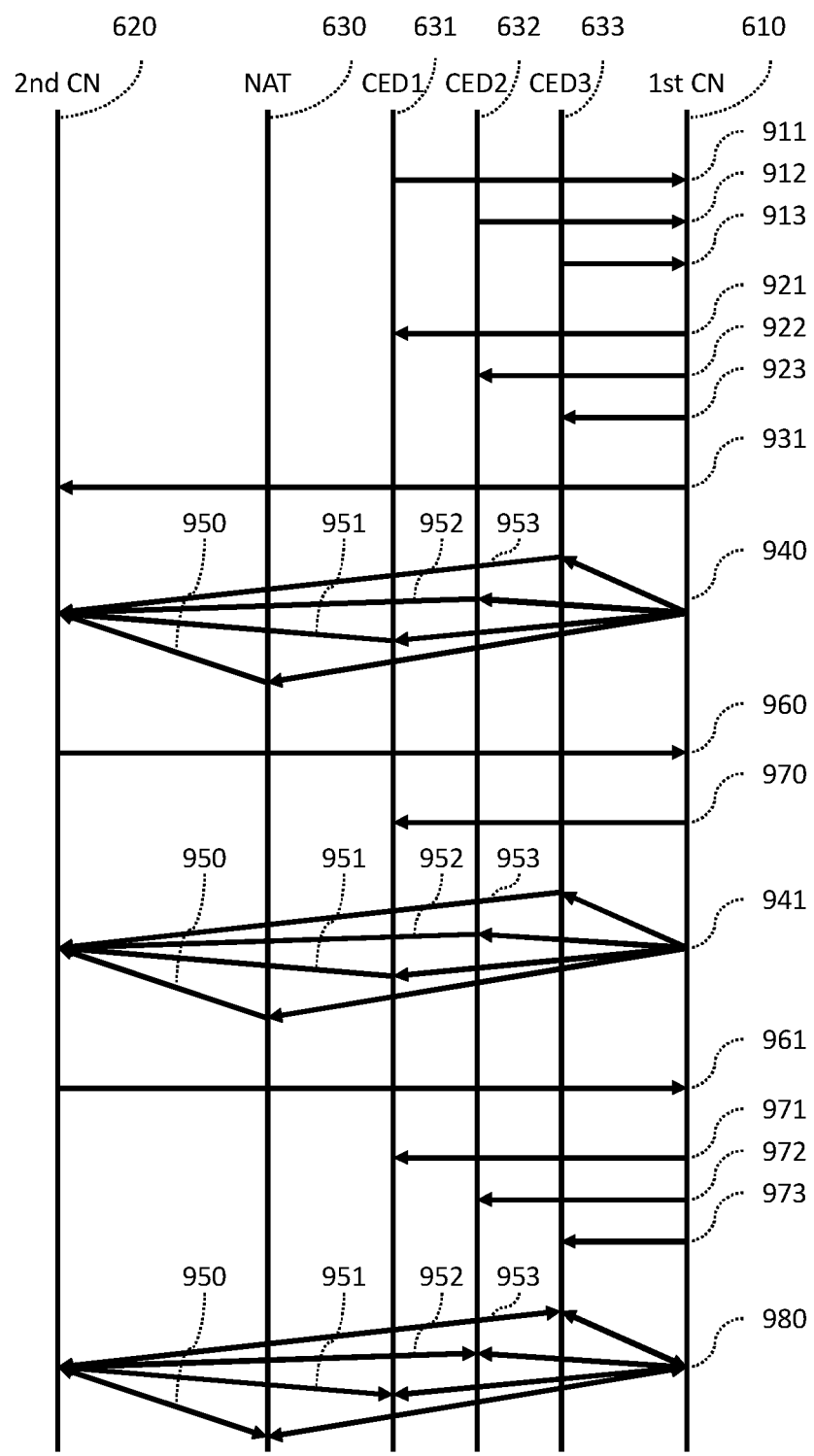
FIG. 9 is a signaling diagram illustrating communication in a network using CED.

FIG. 9 is a further signaling diagram illustrating signaling for improving communication between a first CN 610 and a second CN 620 via propagation paths involving a transmission via one or more CEDs 631, 632, 633 and optionally via a natural propagation path, wherein said natural propagation path may involve a reflection at a wall 630, for example. In contrast to the example of FIG. 8, it is the first CN 610, which transmits reference signals as will be explained further below.

The first CN is configured for controlling the first CED 631, wherein the first CED 631 is reconfigurable to provide multiple spatial filterings, each one of the multiple spatial filterings being associated with a respective input spatial direction from which incident signals on radio channel are accepted and with a respective output spatial direction into which the incident signals are transmitted by the first CED.

Optionally, the first CN 610 may obtain, from the first CED 631, a message 911 indicative of a capability of the first CED 631 to induce a phase shift before transmitting an incident signal into the output spatial direction. Corresponding messages 912, 913 may be provided by the CEDs 632, 633 to the first CN 610.

The first CN 610 transmits, to the second CN 620 on the radio channel, a first reference signal 940 via a first propagation path 951 and a second propagation path. Transmitting the first reference signal 940 via the first propagation path 951 involves a transmission of a component of the reference signal 940 via the first CED 631. The second propagation path may be a natural propagation path, i.e., a propagation path free of a reception/transmission by a CED, e.g. the propagation path 950. However, the second propagation path may also be a propagation path 952 involving a transmission of a component of the reference signal 940 via the second CED 632.

The second CN 620 measures a first reception property of the first reference signal 940 and provides, to the first CN 610, a message 960 indicative of the first reception property. The first CN 610 provides, to the first CED 631, a message 970 for configuring the first CED 631 to induce a first phase shift in the first propagation path 951.

Afterwards, the first CN 610 may transmit, to the second CN 620 on the radio channel, a second reference signal 941 via the first propagation path 951 and the second propagation path 950 (or 952) and may obtain, from the second CN 620, a message 961 indicative of a second reception property of the second reference signal 941. Based on a comparison of the first reception property and the second reception property, the first CN 610 may provide, to the first CED 631, a message 971 for configuring the first CED 631 to induce a second phase shift in the first propagation path 951 or start receiving and/or transmitting payload data from and/or to the second CN 620 on the radio channel. In other words, the second reference signal 941 may be used to determine whether the first phase shift has already (sufficiently) improved the channel between the first CN 610 and the second CN 620 or whether a different, second phase shift should be induced by the first CED 631. Inducing a second phase shift may include not applying a phase shift at all.

Simply determining the reception property after changing phase shifts induced by CEDs and selecting the optimal phase shift from the applied phase shifts based on the reception properties may be particularly easy to implement.

The transmitting of the first reference signal 940, obtaining the first reception property and providing of the message 970 for configuring the first CED 631 to induce a first phase shift in the first propagation path 951 may be triggered by a detection of a received relative signal power during an established communication between the first CN 610 and second 620 falls below a predefined threshold. This may also be referred to as detecting a fading signal power. The signal power may be determined during the exchange of payload data, for example during the exchange of payload data 980 as explained below.

Instead of simply testing different phase shifts, determining an appropriate phase shift may involve estimating the channel between the first CN 610 and the second CN 620 as well as optimizing control variables for the CEDs participating in the transmission of signals between the first CN 610 and the second CN 620 on the radio channel.

The first CN 610 may provide messages 921, 922, 923 to the CEDs 631, 632, 633 indicative of one or more values of respective control variables to be applied during transmission of reference signals. In the following, it may be assumed that the control variables correspond to phase shifts. The messages 921, 922, 923 may also be indicative of time slots for applying the phase shifts.

The second CN 620 may obtain, from the first CN 610, a message 931 triggering the second CN 620 to measure reception properties of reference signals 940, 941 to be transmitted and then provide a respective message 961 to the first CN 610. In examples, the message 931 may be indicative of a configuration for measuring the reference signals. In other examples, the measuring configuration for the reference signals 940, 941 may be pre-configured by the network.

The first CN 610 may obtain a message 961 indicative of the reception properties for the reference signals 940, 941 and may determine optimized phase shifts. Some general examples for determining optimized values for control variables have been presented above. In examples, it may also be possible that the message 961 is already indicative of the optimized phase shifts, i.e. the second CN 620 determined the optimized phase shifts based on the reception properties of the reference signals 940, 941.

The CEDs 631, 632, 633 may obtain, from the first CN 610, messages 971, 972, 973 indicative of the optimized phase shifts. Thereafter, the first CN 610 may start receiving and/or transmitting payload data 980 from and/or to the second CN 620 with the optimized phase shifts.

For further illustration, above, various scenarios have been described in which the spatial filter provided by the CED is associated with a respective spatial direction into which the incident signals are reflected. It is, as a general rule, that the spatial filter is designed to provide a reflection into a single spatial direction or multiple spatial directions.

For further illustration, well above various scenarios have been described with an implementation of the CED using an antenna array, similar techniques may be readily applied to other kinds and types of surfaces having a re-configurable refractive index.

As explained, CEDs or LIS (large intelligent surface) reflectors are predicted to form an essential part of mm-wave communication systems to combat large propagation loss and blocking.

The invention claimed is:

1. A method of operating a first communication node (CN) wherein the first CN is configured for controlling a first coverage enhancing device (CED) wherein the first CED is reconfigurable to provide multiple spatial filterings, each one of the multiple spatial filterings being associated with a respective input spatial direction from which incident signals on a radio channel are accepted and with a respective output spatial direction into which the incident signals are transmitted by the first CED, the method comprising
receiving, from a second CN on the radio channel, a first reference signal via a first propagation path and a second propagation path, wherein receiving the first reference signal via the first propagation path involves receiving a component of the reference signal via the first CED,
measuring a first reception property of the first reference signal, and
providing, to the first CED, a message for configuring the first CED to induce a first phase shift in the first propagation path.

2. The method of operating of the first CN of claim 1, wherein the method comprises
receiving, from the second CN on the radio channel, a second reference signal via the first propagation path and the second propagation path, and
measuring a second reception property of the second reference signal.

3. The method of operating the first CN of claim 2, wherein the method further comprises
based on a comparison of the first reception property and the second reception property,
providing, to the first CED, a message for configuring the first CED to induce a second phase shift in the first propagation path, or
receiving and/or transmitting payload data from and/or to the second CN on the radio channel.

4. The method of operating the first CN of claim 1, wherein the first phase shift in the first propagation path and/or the second phase shift in the first propagation path are selected from two or more predefined phase shifts.

5. The method of operating the first CN of claim 4, wherein the first phase shift in the first propagation path and/or the second phase shift in the first propagation path is 180°.

6. The method of operating the first CN of claim 2, wherein a propagation via the second propagation path involves a reception and transmission of the first reference signal by a second CED, wherein the method further comprises
providing, to the second CED, a message for configuring the second CED to induce a first phase shift in the second propagation path,
receiving, from the second CN on the radio channel, a third reference signal via the first propagation path and the second propagation path,
measuring a third reception property of the third reference signal,
determining the best of the first reception property, the second reception property and the third reception property.

7. The method of operating the first CN of claim 6, performing based on the determining at least one of
providing, to the first CED, a message for configuring the first CED to induce a second phase shift in the first propagation path;
providing, to the second CED, a message for configuring the second CED to induce a second phase shift in the second propagation path; and
receiving and/or transmitting payload data from and/or to the second CN on the radio channel.

8. The method of operating the first CN of claim 1, wherein the method comprises
in response to detecting a received relative signal power below a predefined threshold, triggering
the receiving of the first reference signal,
the measuring of the first reception property,
the providing of the message for configuring the first CED to induce a first phase shift in the first propagation path.

9. The method of operating the first CN of claim 8, wherein the triggering comprises
providing, to the second CN, a request to transmit the first reference signal.

10. A method of operating a first communication node (CN) wherein the first CN is configured for controlling a first coverage enhancing device (CED) the first CED being reconfigurable to provide multiple spatial filterings, each one of the multiple spatial filterings being associated with a respective input spatial direction from which incident signals on a radio channel are accepted and with a respective output spatial direction into which the incident signals are transmitted by the first CED, the method comprising
transmitting, to a second CN on the radio channel, a first reference signal via a first propagation path and a second propagation path, wherein transmitting the first reference signal via the first propagation path involves transmitting a component of the reference signal via the first CED,
obtaining, from the first CN, a message indicative of a first reception property of the first reference signal, and
providing, to the first CED, a message for configuring the first CED to induce a first phase shift in the first propagation path.

11. The method of operating of the first CN of claim 10, transmitting, to the second CN on the radio channel, a second reference signal via the first propagation path and the second propagation path,
obtaining, from the second CN, a message indicative of a second reception property of the second reference signal.

12. The method of operating the first CN of claim 11, wherein the method further comprises
based on a comparison of the first reception property and the second reception property,
providing, to the first CED, a message for configuring the first CED to induce a second phase shift in the first propagation path, or
receiving and/or transmitting payload data from and/or to the first CN on the radio channel.

13. The method of operating the first CN of claim 10, wherein the first phase shift in the first propagation path and/or the second phase shift in the first propagation path are selected from two or more predefined phase shifts.

14. The method of operating the first CN of claim 13, wherein the first phase shift in the first propagation path and/or the second phase shift in the first propagation path is 180°.

15. The method of operating the first CN of claim 11, wherein a propagation via the second propagation path involves a reception and transmission of the first reference signal by a second CED, wherein the method further comprises providing, to the second CED, a message for configuring the second CED to induce a first phase shift in the second propagation path,
  transmitting, to the second CN on the radio channel, a third reference signal via the first propagation path and the second propagation path,
  obtaining, from the second CN, a message indicative of a third reception property of the third reference signal,
  determining the best of the first reception property, the second reception property and the third reception property.

16. The method of operating the first CN of claim 15, performing based on the determining at least one of providing, to the first CED, a message for configuring the first CED to induce a second phase shift in the first propagation path;
  providing, to the second CED, a message for configuring the second CED to induce a second phase shift in the second propagation path; receiving and/or transmitting payload data from and/or to with the second CN on the radio channel.

17. The method of operating the first CN of claim 10 wherein the method comprises in response to detecting a received relative signal power below a predefined threshold, triggering
  the transmitting of the first reference signal,
  the obtaining of the message indicative of the first reception property,
  the providing of the message for configuring the first CED to induce a first phase shift in the first propagation path.

18. The method of operating the first CN of claim 17, wherein the triggering comprises providing, to the second CN, a request to measure a first reception property of the first reference signal.

19. A method of operating a first coverage enhancing device (CED) the first CED being reconfigurable to provide multiple spatial filterings, each one of the multiple spatial polarization filterings being associated with a respective input spatial direction from which incident signals on a radio channel are accepted and with a respective output spatial direction into which the incident signals are transmitted by the first CED, the method comprising obtaining, from a first communication node (CN) a message for configuring the first CED to induce a first phase shift in a first propagation path between the first CN and a second CN.

20. A first communication node (CN) comprising control circuitry, wherein the control circuitry is configured for performing the method of claim 1.

* * * * *